United States Patent
Shigeeda

(10) Patent No.: US 10,897,426 B2
(45) Date of Patent: Jan. 19, 2021

(54) RECEPTION APPARATUS AND COMMUNICATION APPARATUS

(71) Applicant: MITSUBISHI ELECTRIC CORPORATION, Tokyo (JP)

(72) Inventor: Tetsuya Shigeeda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 283 days.

(21) Appl. No.: 15/025,449

(22) PCT Filed: Sep. 30, 2013

(86) PCT No.: PCT/JP2013/076535
§ 371 (c)(1),
(2) Date: Mar. 28, 2016

(87) PCT Pub. No.: WO2015/045151
PCT Pub. Date: Apr. 2, 2015

(65) Prior Publication Data
US 2016/0212059 A1 Jul. 21, 2016

(51) Int. Cl.
*H04L 12/863* (2013.01)
*H04L 12/40* (2006.01)
*H04L 12/879* (2013.01)

(52) U.S. Cl.
CPC ...... *H04L 47/622* (2013.01); *H04L 12/40169* (2013.01); *H04L 49/9026* (2013.01)

(58) Field of Classification Search
CPC .............. H04L 47/622; H04L 49/9026; H04L 12/40169
See application file for complete search history.

(56) References Cited

U.S. PATENT DOCUMENTS 6,687,754 B1 * 2/2004 Sorensen .............. H04L 12/433
　　　　　　　　　　　　　　　　　　　　709/222
6,751,228 B1 * 6/2004 Okamura .............. H04J 3/0632
　　　　　　　　　　　　　　　　　　　　370/412

(Continued)

FOREIGN PATENT DOCUMENTS

JP　　2000-235536 A　　8/2000
JP　　2002-164918 A　　6/2002

(Continued)

OTHER PUBLICATIONS

The extended European Search Report dated Mar. 9, 2017, by the European Patent Office in corresponding European Application No. 13894116.6. (8 pages).

(Continued)

*Primary Examiner* — Ajit Patel
*Assistant Examiner* — Wilfred Thomas
(74) *Attorney, Agent, or Firm* — Buchanan Ingersoll & Rooney PC

(57) ABSTRACT

The present invention provides a reception apparatus constituting an information-control central apparatus that is a communication apparatus that performs one-to-many communication with devices as a plurality of counterpart communication apparatuses. The reception apparatus includes a packet processor that processes a received packet and a buffer that, in response to input of a packet received from a counterpart communication apparatus, adjusts an interval between packets to be sequentially inputted to the packet processor to a specified value or more and outputs the input packet to the packet processor, thereby to avoid occurrence of packet loss.

11 Claims, 3 Drawing Sheets

(56) References Cited

U.S. PATENT DOCUMENTS

| | | | |
|---|---|---|---|
| 6,885,659 B2 | 4/2005 | Aoyagi et al. | |
| 6,948,186 B1 | 9/2005 | Brosey | |
| 7,489,678 B2 | 2/2009 | Aoyagi et al. | |
| 7,873,964 B2 | 1/2011 | Huang et al. | |
| 7,924,824 B2 | 4/2011 | Aoyagi et al. | |
| 8,416,430 B2 | 4/2013 | Suzue | |
| 8,943,214 B2 | 1/2015 | Yamaura et al. | |
| 10,037,458 B1* | 7/2018 | Mahmoud | G06K 9/00389 |
| 10,637,639 B2* | 4/2020 | Furuishi | G05B 19/05 |
| 2001/0030966 A1* | 10/2001 | Choi | H04L 49/3081 |
| | | | 370/395.4 |
| 2001/0034799 A1* | 10/2001 | Ito | H04L 12/40071 |
| | | | 709/250 |
| 2001/0038644 A1* | 11/2001 | Yamauchi | H04N 5/775 |
| | | | 370/487 |
| 2002/0064186 A1 | 5/2002 | Aoyagi et al. | |
| 2002/0131443 A1* | 9/2002 | Robinett | H04N 21/63345 |
| | | | 370/442 |
| 2004/0136368 A1* | 7/2004 | Wakayama | H04L 45/745 |
| | | | 370/389 |
| 2005/0117583 A1* | 6/2005 | Uchida | H04L 29/06027 |
| | | | 370/395.4 |
| 2005/0129006 A1 | 6/2005 | Aoyagi et al. | |
| 2005/0180452 A1* | 8/2005 | Rhee | H04N 21/434 |
| | | | 370/464 |
| 2006/0064508 A1* | 3/2006 | Panwar | H04L 49/90 |
| | | | 709/250 |
| 2006/0067231 A1 | 3/2006 | Ikoma et al. | |
| 2008/0148291 A1 | 6/2008 | Huang et al. | |
| 2008/0192741 A1 | 8/2008 | Lee et al. | |
| 2009/0016366 A1* | 1/2009 | Endo | H04L 45/00 |
| | | | 370/401 |
| 2009/0125714 A1* | 5/2009 | Khosmood | H04L 63/0263 |
| | | | 713/154 |
| 2009/0213727 A1 | 8/2009 | Aoyagi et al. | |
| 2009/0238197 A1* | 9/2009 | Cadigan, Jr. | H04L 47/13 |
| | | | 370/412 |
| 2009/0252055 A1* | 10/2009 | Yazaki | H04L 49/205 |
| | | | 370/253 |
| 2010/0054269 A1* | 3/2010 | Brown | H04L 47/562 |
| | | | 370/412 |
| 2010/0124234 A1* | 5/2010 | Post | H04L 47/29 |
| | | | 370/412 |
| 2011/0004815 A1* | 1/2011 | Schultz | H04H 20/59 |
| | | | 714/799 |
| 2011/0247004 A1 | 10/2011 | Matsukawa | |
| 2011/0292934 A1* | 12/2011 | Oishi | H04H 40/27 |
| | | | 370/389 |
| 2012/0212764 A1 | 8/2012 | Tanaka | |
| 2015/0029841 A1* | 1/2015 | Takayanagi | H04L 47/2475 |
| | | | 370/230 |

FOREIGN PATENT DOCUMENTS

| | | |
|---|---|---|
| JP | 2003-244665 A | 8/2003 |
| JP | 2004-094473 A | 3/2004 |
| JP | 2006-031145 A | 2/2006 |
| JP | 2006-121667 A | 5/2006 |
| JP | 2007-142582 A | 6/2007 |
| JP | 2008-541605 A | 11/2008 |
| JP | 2009-077108 A | 4/2009 |
| JP | 2010-170320 A | 8/2010 |
| JP | 2010-226283 A | 10/2010 |
| JP | 2011-210201 A | 10/2011 |
| JP | 2012-175490 A | 9/2012 |
| WO | 2008054941 A2 | 5/2008 |
| WO | WO 2011/033562 A1 | 3/2011 |

OTHER PUBLICATIONS

International Search Report (PCT/ISA/210) dated Oct. 29, 2013, by the Japanese Patent Office as the International Searching Authority for International Application No. PCT/JP2013/076535.
Written Opinion (PCT/ISA/237) dated Oct. 29, 2013, by the Japanese Patent Office as the International Searching Authority for International Application No. PCT/JP2013/076535.
An English Translation of the Office Action (Notice of Rejection) dated Jun. 21, 2016, by the Japanese Patent Office in corresponding Japanese Patent Application No. 2015-538798. (3 pages).

* cited by examiner

CONTROL SIGNAL

RECEPTION APPARATUS AND COMMUNICATION APPARATUS

FIELD

The present invention relates to a reception apparatus constituting a communication apparatus that communicates with a plurality of devices.

BACKGROUND

As a mode of communication systems, there is a configuration in which one communication apparatus communicates with a plurality of communication apparatuses. For example, in a network formed of one controlling device and a plurality of controlled devices, the controlling device issues an operation instruction to a part or all of the plurality of controlled devices, and the controlled devices that have received the instruction operate according to the content of the instruction. The controlled device having received the instruction may return a response signal at a predetermined timing. Examples of the response signal include a signal indicating the start of an instructed operation or the completion of the operation and a signal of various data held by the controlled device. For the sake of managing a network or other sakes, there are some signals transmitted by the controlled devices in their own rights without any instructions from the controlling device.

In general, when there are different kinds of signals, processing loads (processing delay times) imposed for reception processings of the signals are different from each other. When first communication requiring a larger processing load is executed and subsequently second communication requiring a smaller processing load is executed, if attention is paid to the second communication, a timing of starting the processing for the second communication is delayed. Accordingly, a required time until completion of the second communication is longer than that in a normal condition. For example, when the second communication is more important than the first communication and prolongation of the required time for completing the communication is a problem, the problem can be solved by the technique described in Patent Literature 1. According to a data communication apparatus described in Patent Literature 1, the data communication apparatus includes a plurality of communication processing paths and performs data communication and other communication using different communication processing paths, thereby making it possible to avoid decrease in processing throughput.

CITATION LIST

Patent Literature

Patent Literature 1: Japanese Patent Application Laid-open No. 2000-235536

SUMMARY

Technical Problem

The data communication apparatus described in Patent Literature 1 is effective for sequentially receiving signals of a plurality of kinds having different processing loads. However, the data communication apparatus is not configured to take account of a case where a plurality of communication apparatuses simultaneously transmit signals of the same kind to a certain communication apparatus in a network configuration for communicating with a plurality of counterparts, that is, a case where one communication apparatus sequentially receives signals of the same kind, for example.

When a plurality of communication apparatuses concurrently transmit signals (packets) of the same kind to one communication apparatus, the receiving-side communication apparatus needs to process a large number of packets in a short time. However, when so many packets that the number of the packets exceeds the processing capability arrive, packets that have not been processed may be lost (packet loss may occur). To solve this problem, countermeasures such as employing a CPU with a high processing capability can be taken. However, in this case, another problem of increase in the apparatus cost arises.

The present invention has been achieved in view of the above circumstances, and an object of the present invention is to provide a reception apparatus and a communication apparatus that can avoid occurrence of the packet loss even when receiving a large number of packets in a short time period.

Solution to Problem

In order to solve the above-mentioned problem and achieve the object, the present invention provides a reception apparatus constituting a communication apparatus that performs one-to-many communication with a plurality of counterpart communication apparatuses, the reception apparatus comprising: a packet processor that processes a received packet; and a buffer that, in response to input of a packet received from a counterpart communication apparatus, adjusts an interval between packets sequentially inputted to the packet processor to a specified value or more and outputs the input packet to the packet processor.

Advantageous Effects of Invention

According to the present invention, occurrence of the packet loss can be prevented by avoiding increase in processing load imposed for packet processing.

DESCRIPTION OF EMBODIMENTS

Exemplary embodiments of a reception apparatus and a communication apparatus according to the present invention will be explained below in detail with reference to the accompanying drawings. The present invention is not limited to the embodiments.

First Embodiment

Figure 1:
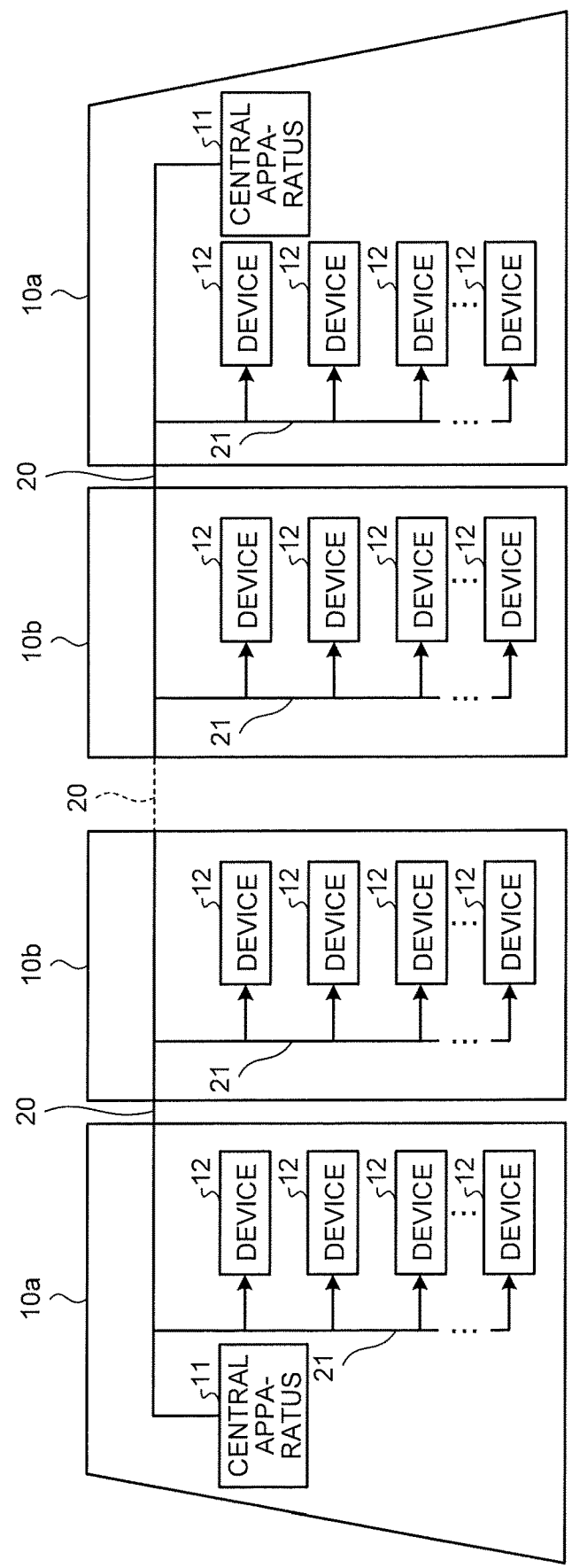
FIG. 1 is a diagram illustrating a configuration example of a communication system established in a train.

FIG. 1 is a diagram illustrating a configuration example of a communication system established in a train as an example of a communication system including a communication apparatus to which the reception apparatus according to the present invention is applied. A case where the reception apparatus according to the present invention is applied to a communication system established in a train is explained herein. However, a communication system to which the present invention can be applied is not limited to the in-train communication system.

The formation of a train illustrated in FIG. 1 includes a plurality of vehicles. As an example, the train includes two leading vehicles 10a and vehicles 10b other than the leading vehicles 10a. An information-control central apparatus (hereinafter, simply referred to as "central apparatus") 11 is mounted in each leading vehicle 10a. A plurality of train-mounted devices (hereinafter, simply referred to as "devices") 12 that are connected to the central apparatus 11 via an inter-vehicle transmission path 20 and an in-vehicle transmission path 21 are provided in each of the vehicles 10a and 10b.

The central apparatus 11 is configured to include the reception apparatus according to the present invention and the other parts, and connected to a control operation apparatus (not illustrated) such as a master controller to perform input/output processing of train information. The central apparatus 11 transmits data including control information and the like to the devices 12 and collects data from the devices 12. For example, the central apparatus 11 broadcasts inquiry signals about the operation states to the devices 12 in the system and receives response signals from the devices 12. Examples of the devices 12 include an air conditioner, a lighting device, a display, a motor, and a brake.

Figure 2:
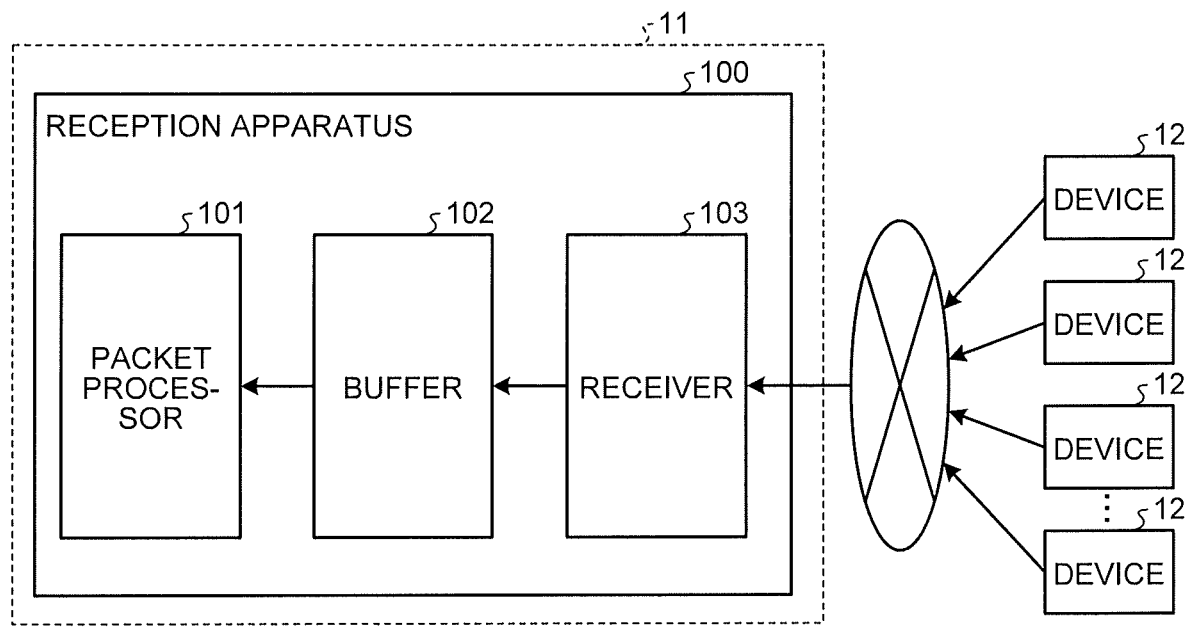
FIG. 2 is a diagram illustrating a configuration example of a reception apparatus according to a first embodiment.

FIG. 2 is a diagram illustrating a configuration example of a reception apparatus 100 according to the present embodiment. As described above, the reception apparatus 100 constitutes the central apparatus 11 and receives signals transmitted from the plurality of devices 12. The reception apparatus 100 includes a packet processor 101, a buffer 102, and a receiver 103. The receiver 103 receives packets that are signals transmitted from the devices 12 and outputs the packets to the buffer 102. The buffer 102 outputs the packets inputted from the receiver 103 to the packet processor 101 immediately or after the lapse of a predetermined time. The packet processor 101 performs various kinds of processing of the packets received from the buffer 102, the processing including, for example, a process of analyzing the packets and taking out necessary information therefrom.

As illustrated in FIGS. 1 and 2, the central apparatus 11 communicates with the plurality of devices 12. However, when each device 12 transmits a packet to the central apparatus 11, one of the devices 12 starts transmission processing without considering the communication states between the other devices 12 and the central apparatus 11. For this reason, many devices 12 may transmit the packets at the same timing. In this case, the reception apparatus 100 of the central apparatus 11 needs to process a large number of packets in a short time. The reception apparatus 100 is configured to take account of that case. To avoid the occurrence of a processing error (packet loss) that is caused by the overload state of the packet processor 101, the buffer 102 performs operations that are described below.

Detailed operations of the buffer 102 are explained. When receiving a packet from the receiver 103, the buffer 102 determines the output timing of the newly received packet to the packet processor 101 by considering the elapsed time from an instant of outputting a packet that has been previously received and outputs the new packet at the determined timing. More specifically, the buffer 102 determines the output timing to the packet processor 101 in such a way that an interval between the timings of outputting the packets to the packet processor 101 is not less than a constant value T. That is, when the buffer 102 receives a plurality of packets from the receiver 103 in a period having a period length of T, the buffer 102 outputs the second packet of the plurality of packets received in this period at a time point at which the time T has elapsed from an instant of outputting the first packet. When the third packet exists, the buffer 102 outputs the third packet at a time point at which the time T has elapsed from an instant of outputting the second packet. The same is true for the fourth or later packets. T is assumed as a value that is determined in advance by considering the processing capability of the packet processor 101. For example, T=0.5 ms is assumed.

For example, the buffer 102 has a timer for counting the time T. The timer starts (starts counting the time T) each time a packet is outputted to the packet processor 101. When receiving a packet from the receiver 103, the buffer 102 checks the timer. When the timer has expired (the count of the time T has been completed), the buffer 102 immediately outputs the received packet and starts the timer. On the other hand, when the timer has not expired, the buffer 102 waits until the timer expires, and then outputs the packet (and also starts the timer).

As described above, to avoid a large number of packets from being inputted in a short time period to the packet processor 101 that processes the packets received from the devices 12, the buffer 102 that adjusts the packet-input timing to the packet processor 101 is included in the reception apparatus 100 according to the present embodiment. By doing so, it is possible to prevent the occurrence of a processing error that is caused by the overload state of the packet processor 101.

Since the occurrence of a processing error is prevented, failure to take packets (packet loss) does not occur and the frequency of retransmission control for requesting the devices 12 to retransmit a lost packet can be also made low. Therefore, the traffic from the devices 12 to the reception apparatus 100 does not increase more than required.

Second Embodiment

A reception apparatus of a second embodiment is explained. A configuration of a communication system to which the reception apparatus according to the second embodiment is applied are identical to that of the first embodiment (see FIG. 1).

Figure 3:
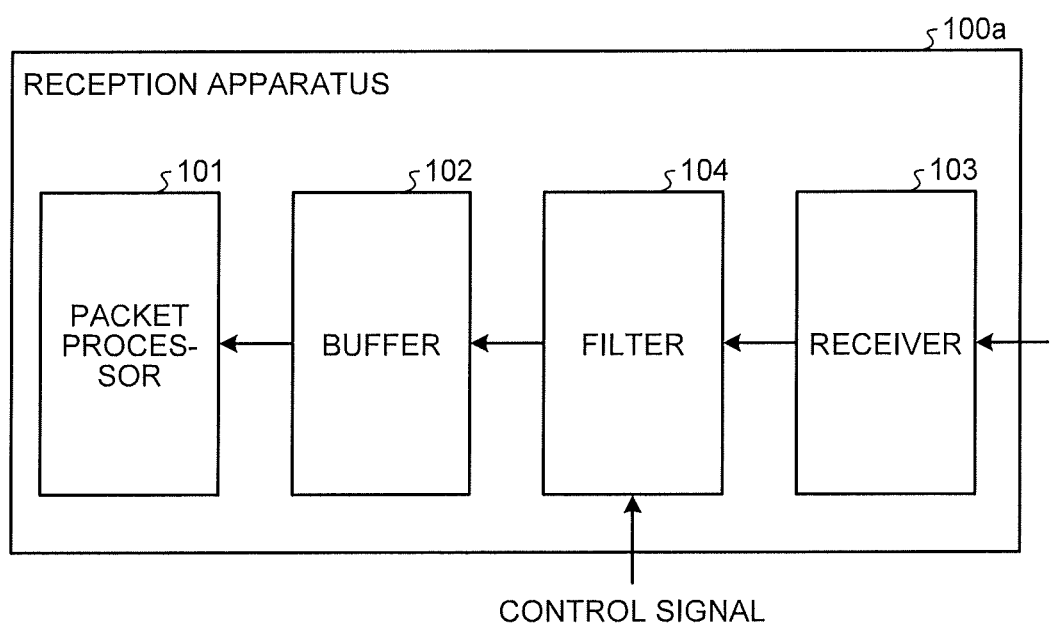
FIG. 3 is a diagram illustrating a configuration example of a reception apparatus according to a second embodiment.

FIG. 3 is a diagram illustrating a configuration example of a reception apparatus 100a according to the second embodiment. The reception apparatus 100a is configured by adding a filter 104 to the reception apparatus 100 according to the first embodiment illustrated in FIG. 2. The substantial operations of constituent elements other than the filter 104 are identical to those in the first embodiment, although output destinations and input sources of packets of the former are partially different from the latter. Therefore, explanations thereof are omitted.

The filter 104 receives packets from the receiver 103 and outputs all or part of the packets to the buffer 102. That is, the filter 104 outputs packets of a specific kind to the buffer 102 according to an instruction provided by a control signal. Packets of kinds other than the specific kind that is instructed by the control signal are discarded, for example. These packets may be outputted to other constituent elements (not illustrated, for example, other devices constituting the central apparatus 11) instead of being discarded. The control signal may instruct to output all packets to the buffer 102 (instruct to stop a filter function) in some cases. For example, the control signal is inputted from a control operation apparatus (not illustrated) such as a master controller provided in a cab of a train.

For example, the filter 104 classifies packets inputted from the receiver 103 into first packets that include data (hereinafter, referred to as "control data") used for controlling the devices 12 and second packets that are packets other than the first packets. The filter 104 outputs the first packets to the packet processor 101 and discards the second packets. For example, packets inputted from the receiver 103 are identified using a port number. For example, the port number is determined as "8001" in advance when the control data are to be transmitted. The packet identifying method using a port number is one example and the packets may be identified by other methods. Packets may be identified based on priorities, or packets may be identified by adding identification information that indicates control data to the head of the data and using the identification information. Packets may be identified using a plurality of kinds of information such as port numbers and priorities. Examples of the second packet include an ICMP (Internet Control Message Protocol) packet and an ARP (Address Resolution Protocol) packet.

The filter 104 may have a function of processing all or part of the second packets. For example, in some cases, when the filter 104 has a function of processing ICMP packets or ARP packets and receives an ICMP packet or an ARP packet, the filter 104 does not discard the packet but may return a response packet in place of the packet processor 101. For example, when the filter 104 receives an Echo Message, the filter 104 returns an Echo Reply Message. In this configuration, the processing load on the packet processor 101 can be reduced and influence on the operations of other devices can be minimized.

As described above, the reception apparatus 100a according to the present embodiment is configured by adding the filter 104 to the reception apparatus 100 according to the first embodiment, the filter 104 discriminating the kinds of received packets and passes packets of a specific kind to the buffer 102. Accordingly, an important packet (for example, a packet including control data) that needs to be processed with priority by the packet processor 101 can be selected and processed by the packet processor 101, thereby preventing the load on the packet processor 101 from increasing. The kind of packets to be passed is made variable by the filter 104. For this reason, for example, when packets (control packets) including control data are expected to be intensively transmitted, filtering is performed, and when the control packets are expected not to be intensively transmitted, filtering is not performed. Such flexible operations can be realized. Control packets are intensively transmitted when the central apparatus 11 issues control-data transmitting instructions to the devices 12 by broadcast or multicast, for example. Accordingly, it is possible to realize operations including an operation of filtering for a certain time period after the instructions are issued (for example, a time period having a length that is determined according to the number of the devices 12 in the system) can be performed.

FIG. 3 illustrates the configuration example in which the buffer 102 and the filter 104 are separated from each other for the sake of easy-to-understand explanation. However, the buffer 102 and the filter 104 may be combined to be a single part. That is, both of the processing to be performed by the buffer 102 and the processing to be performed by the filter 104 may be performed by either the buffer 102 or the filter 104.

Third Embodiment

A reception apparatus of a third embodiment is explained. A configuration of a communication system to which the reception apparatus according to the third embodiment is applied are identical to those of the first and second embodiments (see FIG. 1).

Figure 4:
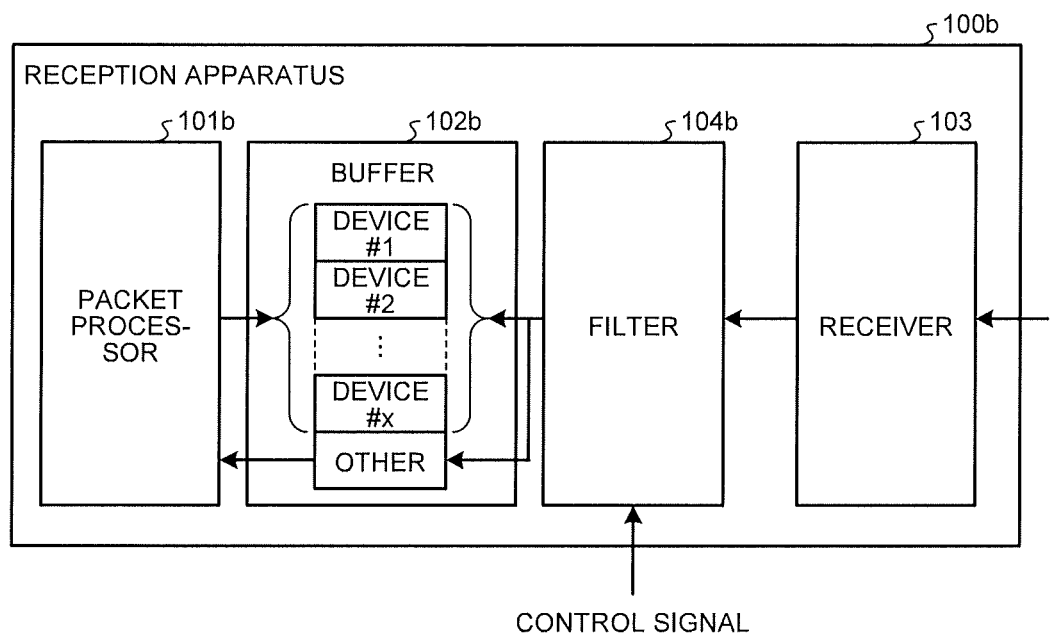
FIG. 4 is a diagram illustrating a configuration example of a reception apparatus according to a third embodiment.

FIG. 4 is a diagram illustrating a configuration example of a reception apparatus 100b according to the third embodiment. The reception apparatus 100b has a configuration in which the packet processor 101, the buffer 102 and the filter 104 of the reception apparatus 100a according to the second embodiment illustrated in FIG. 3 are replaced with a packet processor 101b, a buffer 102b and a filter 104b, respectively. Operations of the receiver 103 are identical to those of the first embodiment, and so explanations thereof are omitted.

In the reception apparatus 100 according to the first embodiment and the reception apparatus 100a according to the second embodiment, the buffer 102 outputs packets while considering prevention of a plurality of packets from being inputted to the packet processor 101 in a short time period. On the other hand, in the reception apparatus 100b according to the present embodiment, the packet processor 101b reads out a packet stored in the buffer 102b at its own timing. That is, the packet processor 101b adjusts a timing for reading out the packet according to the processing load state of the packet processor 101b itself. In a heavier load state, the packet processor 101b delays the reading-out timing, and in a lighter load state, the packet processor 101b advances the reading-out timing.

The buffer 102b has a plurality of first regions for classifying and holding packets of a specific kind for each device 12 that is a transmission source and a second region for collecting and holding other packets that differ from the packets of the specific kind. Packets stored in the first regions are held without being outputted until an instruction from the packet processor 101b is received. Packets stored in the second region are outputted to the packet processor 101b by the buffer 102b at a predetermined timing. For example, the output timing used herein is determined in the same manner as in the buffer 102 according to the first embodiment.

Similarly to the filter 104 that has been explained in the second embodiment, the filter 104b outputs packets of a specific kind that is specified by a control signal to the buffer 102b. At this time, the filter 104b checks the device 12 that is a transmission source of a packet to be outputted to the buffer 102b and stores the packet in a region associated with the transmission-source device 12, of a plurality of regions (the first regions mentioned above) present in the buffer 102b. The filter 104b may store all or part of packets of kinds other than the specific kind in the second region in the buffer 102b. Similarly to the filter 104 according to the second embodiment, the filter 104b may have a function of processing the ICMP packets or an ARP function.

In a lighter processing-load state (a state where the processing load is lower than a specified value and a larger number of packets can be processed), the packet processor 101b accesses the first regions (regions denoted by DEVICE #1 to DEVICE #x in FIG. 4) in the buffer 102b at fixed cycles and reads out a packet to process the packet in the same way as in the packet processor 101 according to the first and second embodiments. On the other hand, in a heavier processing-load state (a state where the processing load is higher than the specified value and a large number of packets cannot be processed), the packet processor 101b progresses the processing being currently performed, and accesses the first regions and reads out a packet after the processing load becomes lower than the specified value, to process the read packet. When a packet of a kind other than the specific kind is inputted from the buffer 102b, in a lighter processing-load state, the packet processor 101b may process the packet, but in a heavier processing-load state, the packet processor 101b may discard the packet.

As described above, in the reception apparatus 100b according to the present embodiment, the buffer 102b classifies, as packets of the specific kind, packets (control packets) including control data, for example, for each device that is a transmission source and holds the packets, and the packet processor 101b acquires control packets from the buffer 102b at its own timing that is determined by considering the processing load state of the packet processor 101b itself.

In the first and second embodiments, when packets to be received are concentrated, the buffer 102 adjusts the packet-input timing to the packet processor 101 without considering the processing load state of the packet processor 101. Therefore, the packet-input timing to the packet processor 101 may be delayed beyond necessity, thereby making the processing delay in the entire reception apparatus more than needs. On the other hand, in the present embodiment, because the packet processor 101b reads out the control packets at a timing that is determined by considering the processing load state of the packet processor 101b itself, the overload state of the packet processor 101b can be avoided and occurrence of an unnecessarily amount of processing delay can be avoided in the entire apparatus.

In the present embodiment, the filter 104b checks the transmission source of a packet, classifies the packet, and stores the packet in a region (a region in the buffer 102b) associated with the transmission source. However, the buffer 102b may classify the packets according to transmission source.

INDUSTRIAL APPLICABILITY

As described above, the reception apparatus according to the present invention is useful for a communication apparatus that has a plurality of communication counterparts transmitting signals at a timing determined independently by the respective communication counterparts, and is particularly suitable as a reception apparatus for a communication apparatus that is connected to a network established in a train and performs one-to-many communication using a large number of devices as control targets.

REFERENCE SIGNS LIST 10a leading vehicle, 10b vehicle, 11 information-control central apparatus, 12 train-mounted device, 20 inter-vehicle transmission path, 21 in-vehicle transmission path, 100, 100a, 100b reception apparatus, 101, 101b packet processor, 102, 102b buffer, 103 receiver, 104, 104b filter.

The invention claimed is:

1. A reception apparatus constituting a communication apparatus that performs one-to-many communication with a plurality of counterpart communication apparatuses, which are respective sources of packets, the reception apparatus comprising:
a packet processor that processes packets;
a buffer that (i) includes a timer to count an interval between sequential output of packets received from the plurality of counterpart communication apparatuses to the packet processor each time the buffer outputs one of the received packets to the packet processor, (ii) adjusts the interval between packets to control when the received packets are sequentially output to the packet processor to a specified value or more, (iii) and sequentially outputs the received packets to the packet processor according to the adjusted interval; and
a filter that extracts packets of a specific kind from the packets received from the plurality of counterpart communication apparatuses, outputs the extracted packets to the buffer, and discards packets other than the specific kind, wherein the filter is configured to extract packets for a specified time period during which a greater number of packets are received from the plurality of counterpart communication apparatuses.

2. The reception apparatus according to claim 1, wherein the buffer has a plurality of packet storing regions that are respectively associated the plurality of counterpart communication apparatuses on a one-to-one basis,
the filter stores the extracted packets in the packet storing regions respectively associated with the plurality of counterpart communication apparatuses, and
the packet processor reads out the stored packets in a state in which a processing load of the packet processor is lower than a specified value.

3. The reception apparatus according to claim 1, wherein the filter processes all or part of packets, of the packets received from the plurality of counterpart communication apparatuses, other than the specific kind.

4. The reception apparatus according to claim 3, wherein the filter processes both or one of an ICMP packet and an ARP packet.

5. A communication apparatus comprising the reception apparatus according to claim 1.

6. The communication apparatus according to claim 5, wherein the communication apparatus constitutes a communication system established in a train and the plurality of counterpart communication apparatuses are used as train-mounted devices.

7. A reception apparatus constituting a communication apparatus that performs one-to-many communication with a plurality of counterpart communication apparatuses, which are respective sources of packets, the reception apparatus comprising:
a packet processor that processes packets of a specific kind;
a filter that extracts packets of the specific kind from packets received from the counterpart communication apparatuses, outputs the extracted packets, and discards packets other than the specific kind, wherein the filter is configured to extract packets for a specified time period during which a greater number of packets are received from the plurality of counterpart communication apparatuses; and
a buffer that receives the extracted packets from the filter and sequentially outputs the extracted packets to the packet processor in accordance with a timer interval each time the buffer outputs one of the extracted packets to the packet processor, wherein the timer interval specifies a time between the sequential output of the extracted packets to the packet processor and the buffer adjusts the timer interval to a specified value.

8. The reception apparatus of claim 7, wherein the filter extracts only packets of the specific kind.

9. A reception apparatus constituting a communication apparatus that performs one-to-many communication with a plurality of counterpart communication apparatuses, which are respective sources of packets, the reception apparatus comprising:
- a filter that extracts packets of a specific kind from packets received from the counterpart communication apparatuses outputs the extracted packets, and discards packets other than the specific kind, wherein the filter is configured to extract packets for a specified time period during which a greater number of packets are received from the plurality of counterpart communication apparatuses;
- a buffer that has a plurality of packet storing regions that are respectively associated with each of the plurality of counterpart communication apparatuses on a one-to-one basis, wherein the buffer stores the extracted packets output by the filter in the packet storing regions respectively associated with the plurality of counterpart communication apparatuses; and
- a packet processor that processes one or more of the packets stored in the buffer in a state in which a processing load of the packet processor is lower than a specified value,
- wherein the packet processor receives one or more of packets from the buffer in accordance with a timer interval, wherein the timer interval is adjustable and specifies a time between the sequential output of the one or more packets from the buffer to the packet processor.

10. The reception apparatus of claim 9, wherein the plurality of counterpart communication apparatuses are mounted on a train, and wherein the extracted packets of the specific kind are control packets used for respectively controlling the counterpart communication apparatuses mounted on the train.

11. The reception apparatus of claim 9, wherein the packet processor is configured to read out the extracted packets from the buffer in the state in which the processing load of the packet processor is lower than the specified value.

* * * * *